United States Patent
Kim et al.

(10) Patent No.: US 9,130,213 B2
(45) Date of Patent: Sep. 8, 2015

(54) COMPOSITIONS AND METHODS FOR MANUFACTURING A CATHODE FOR A SECONDARY BATTERY

(75) Inventors: Dong Gun Kim, Gunpo (KR); Sa Heum Kim, Gwacheon (KR); Young Jun Kim, Yongin (KR); Jun Ho Song, Seongnam (KR); Woo Suk Cho, Namyangju (KR); Jeom Soo Kim, Hwaseong (KR); Sang Min Kim, Seoul (KR)

(73) Assignees: Hyundai Motor Company, Seoul (KR); Korea Electronics Technology Institute, Seongnam, Gyeonggi-do (KR)

( * ) Notice: Subject to any disclaimer, the term of this patent is extended or adjusted under 35 U.S.C. 154(b) by 516 days.

(21) Appl. No.: 13/314,073

(22) Filed: Dec. 7, 2011

(65) Prior Publication Data

US 2013/0078521 A1 Mar. 28, 2013

(30) Foreign Application Priority Data

Sep. 27, 2011 (KR) .................. 10-2011-0097846

(51) Int. Cl.
| | |
|---|---|
| H01M 4/58 | (2010.01) |
| H01M 4/136 | (2010.01) |
| H01M 4/36 | (2006.01) |
| H01M 4/62 | (2006.01) |
| H01M 10/052 | (2010.01) |

(52) U.S. Cl.
CPC .............. *H01M 4/136* (2013.01); *H01M 4/366* (2013.01); *H01M 4/5825* (2013.01); *H01M 4/625* (2013.01); *H01M 10/052* (2013.01); *Y02E 60/122* (2013.01)

(58) Field of Classification Search
USPC ........................................ 429/224
See application file for complete search history.

(56) References Cited

U.S. PATENT DOCUMENTS

| | | | |
|---|---|---|---|
| 2008/0153002 A1 | 6/2008 | Nazar et al. | |
| 2008/0241043 A1* | 10/2008 | Barker et al. | 423/301 |
| 2012/0007020 A1* | 1/2012 | Tarascon et al. | 252/182.1 |
| 2012/0025149 A1* | 2/2012 | Liang et al. | 252/506 |
| 2012/0279850 A1* | 11/2012 | Patoux et al. | 204/164 |

FOREIGN PATENT DOCUMENTS

| | | |
|---|---|---|
| JP | 2010-260761 A | 11/2010 |
| KR | 10-2003-0086348 A | 11/2003 |

(Continued)

OTHER PUBLICATIONS

EM Translation of JP2010-260761.*

*Primary Examiner* — Patrick Ryan
*Assistant Examiner* — Lucas J O Donnell
(74) *Attorney, Agent, or Firm* — Mintz Levin Cohn Ferris Glovsky and Popeo, P.C.; Peter F. Corless

(57) ABSTRACT

Disclosed are compositions and methods for producing a cathode for a secondary battery, where a fluorophosphate of the formula $Li_xNa_{2-x}MnPO_4F$ is used as an electrode material. $Li_xNa_{2-x}MnPO_4F$ is prepared by partially substituting a sodium site with lithium through a chemical method. $Li_xNa_{2-x}MnPO_4F$ prepared according to the invention provides a cathode material for a lithium battery that has improved electrochemical activity.

15 Claims, 3 Drawing Sheets

(56) References Cited

FOREIGN PATENT DOCUMENTS

| KR | 10-2010-0072047 A | 6/2010 |
| KR | 1020130031718 A | 3/2013 |
| WO | WO 2010046608 A1 * | 4/2010 |
| WO | WO 2011058239 A1 * | 5/2011 |

* cited by examiner

COMPOSITIONS AND METHODS FOR MANUFACTURING A CATHODE FOR A SECONDARY BATTERY

CROSS-REFERENCE TO RELATED APPLICATION

This application claims under 35 U.S.C. §119(a) the benefit of Korean Patent Application No. 10-2011-0097846 filed on Sep. 27, 2011, the entire contents of which are incorporated herein by reference.

BACKGROUND (a) Technical Field

The present invention relates to compositions and methods for manufacturing a cathode for a secondary battery. More particularly, the present invention relates to compositions and methods for manufacturing a cathode for a secondary battery, where the cathode includes manganese fluorophosphate with lithium or sodium.

(b) Background Art

As the use of portable small-sized electronic devices has become widespread, there has been an active interest in developing new types of secondary batteries such as, for example, nickel metal hydrogen or lithium secondary batteries. For example, a lithium secondary battery uses carbon (such as, e.g., graphite) as an anode composition, lithium-containing oxide as a cathode composition, and a non-aqueous solvent as an electrolyte. Lithium is a metal that has a very high tendency to undergo ionization; consequently, lithium can achieve a high voltage. Thus, lithium is often used in the development of batteries having high energy density.

In a lithium battery, a cathode composition typically includes a lithium transition metal oxide containing lithium in which 90% or greater of the lithium transition metal oxide includes layered lithium transition metal oxides (such as, e.g., cobalt-based, nickel-based, cobalt/nickel/manganese ternary-based, and the like). However, when such layered lithium transition metal oxides are used as a cathode composition, lattice oxygen within the layered lithium transition metal oxides may become deintercalated and participate in an undesired reaction under non-ideal conditions (such as, e.g., overcharge and high temperature), thereby causing the battery to catch fire or explode.

In order to overcome the disadvantages of such layered lithium transition metal oxides, researchers have considered cathode compositions having a spinel or olivine structure. In particular, it has been suggested that a cathode composition including a spinel-based lithium manganese oxide having a three dimensional lithium movement path, or a polyanion-based lithium metal phosphate having an olivine structure, instead of a layered lithium transition metal oxide, may prevent problems in lithium secondary batteries that arise from decreased stability in layered lithium transition metal oxides as a result of cathode deterioration.

The use of the spinel-based lithium manganese oxide as a cathode material has been limited because repeated cycles of battery charging and discharging results in lithium elution. Moreover, spinel-based lithium manganese oxide containing compositions display structural instability as a result of the Jahn-Teller distortion effect.

The use of olivine-based lithium metal phosphates, such as iron (Fe)-based phosphate and manganese (Mn)-based phosphate, as a cathode material has also been limited because these compounds have low electrical conductivity. However, through the use of nano-sized particles and carbon coating, the problem of low electrical conductivity has been improved, and thus the use of olivine-based lithium metal phosphates as a cathode composition has become possible.

For example, it has been recently reported that fluorophosphates may be useful as a cathode material. The fluorophosphate has the following formula: $A_2MPO_4F$, where A represents Li or Na, and M represents a transition metal such as Mn, Fe, Co, Ni, V, or a mixture thereof. Theoretically, the fluorophosphate of formula $A_2MPO_4F$ is expected to have a capacity about twice as high as a conventional lithium metal phosphate since it has two Na atoms. For example, in the case where a fluorophosphate having the formula $Na_2MPO_4F$ (M=Mn, Fe, Co, Ni, V or a mixture thereof) is used as a cathode material for a lithium secondary battery, sodium is deintercalated during the initial charging step and lithium is intercalated during the initial discharging step. In the following cycles of battery charging and discharging, alternating intercalation and deintercalation of lithium occurs during the charging and discharging process. Similarly, in the case where $Na_2MPO_4F$ (M=Mn, Fe, Co, Ni, V or a mixture thereof) is used as a cathode material for a sodium battery, the intercalation and deintercalation of sodium is carried out during charging and discharging.

U.S. Pat. No. 6,872,492 discloses an example of using a fluorophosphate including sodium, such as $NaVPO_4F$, $Na_2FePO_4F$, or $(Na,Li)_2FePO_4F$, as a cathode material for a sodium based battery. However, the example is limited to a sodium based battery, and has not been attempted for a lithium battery.

As another example of the conventional art, sodium iron fluorophosphate ($Na_2FePO_4F$) has been used as a cathode material for a lithium secondary battery, and the structure of $Na_2FePO_4F$ and its electrochemical characteristics have been disclosed. However, iron-based $Na_2FePO_4F$ suffers from a major disadvantage as a cathode material because it has a low charge/discharge potential (about 3.5 V), which is similar to an iron-based olivine material. Attempts to overcome this disadvantage of $Na_2FePO_4F$ have been made by using manganese-based $Na_2MnPO_4F$, which has a higher potential (4V) compared to iron-based $Na_2FePO_4F$. Unfortunately, $Na_2MnPO_4F$ also suffers from a major disadvantage as a cathode material because of electrochemical inactivity due to the low electrical conductivity of a polyanion-based material.

The above information disclosed in this Background section is only for enhancement of understanding of the background of the invention.

SUMMARY OF THE DISCLOSURE

The present invention provides compositions and methods of manufacturing a cathode for a lithium secondary battery, in which nano-sized particles reduce the diffusion length of lithium, and the deintercalation of sodium and the intercalation of lithium are carried out through a chemical method. Consequently, in the improved cathode of the invention, the diffusion path of lithium can be previously established, thereby improving the electrochemical properties of the cathode of the lithium secondary battery.

In one aspect, the present invention provides a composition for a secondary battery cathode that includes a compound represented by the formula $Li_xNa_{2-x}MnPO_4F$, which is prepared by chemical intercalation of lithium into $Na_2MnPO_4F$.

In another aspect, the present invention provides a method for preparing a cathode for a secondary battery, the method including: (i) synthesizing $Na_2MnPO_4F$ with a controlled particle size; and (ii) carrying out lithium intercalation and sodium deintercalation by an ion exchange method.

According to one aspect of the present invention, it is possible to use manganese fluorophosphate including lithium as a cathode material with a high electrochemical potential by chemically intercalating lithium into Na$_2$MnPO$_4$F with a controlled particle size through an ion exchange method. Advantageously, this method establishes a lithium diffusible site or pathway within the cathode material, thereby making it possible to obtain a high charge/discharge property, compared to that of a cathode produced from the same size of a Na$_2$MnPO$_4$F cathode material not including lithium. According to the invention, when the above described cathode material is applied to the cathode of a secondary battery, it is possible to achieve a maximum capacity of at least 4 times higher than that of the same primary particle size of Na$_2$MnPO$_4$F.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 2 shows electron microscopic images of a cathode material prepared by Example 3 of the present invention, in which FIGS. 2a and 2b show the cathode material before and after ion exchange, respectively;

Figure 1:
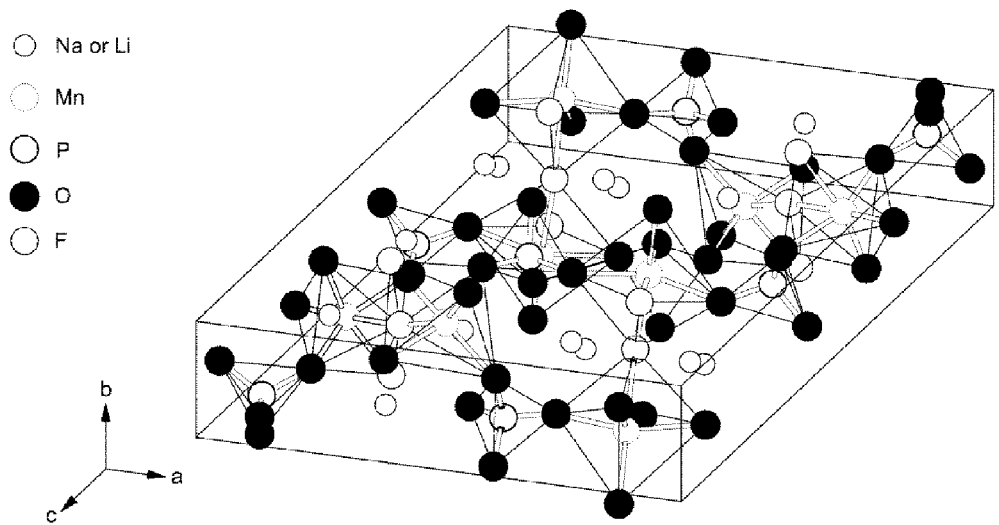
FIG. 1 shows a crystal structure of Li$_x$Na$_{2-x}$MnPO$_4$F, in which octahedral MnO$_4$F$_2$ and tetrahedral PO$_4$ form a framework, and there exists a channel through which lithium and sodium can be intercalated and deintercalated.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

The present invention provides a cathode material for a lithium secondary battery, which includes a manganese-based fluorophosphate compound represented by the following Formula:

$$Li_xNa_{2-x}MnPO_4F$$

The cathode material for a secondary battery, which includes the Formula above, has a primary particle size of about 300 nm or less, is coated with carbon for improvement of conductivity, and shows a potential plateau in discharging of about 3.7 V to about 4.0V.

The present invention also provides a method for producing a cathode material for a lithium secondary battery, the method including:

(i) uniformly mixing sodium (Na) oxide or a precursor thereof, manganese (Mn) oxide or a precursor thereof, phosphate (P) or a precursor thereof, and fluoride (F) or a precursor thereof through ball milling, and carrying out pretreatment on the obtained mixture, followed by firing to synthesize Na$_2$MnPO$_4$F; and (ii) intercalating lithium into the cathode material synthesized in step (i) through an ion exchange method to synthesize Li$_x$Na$_{2-x}$MnPO$_4$F.

According to a preferred embodiment of the present invention, in step (i) the mixture is uniformly mixed for about 6 hours through ball milling, and then subjected to pretreatment under an air atmosphere at about 300° C. for about 2 hours.

According to a preferred embodiment of the present invention, step (ii) includes the step of intercalating lithium ions into the cathode material obtained from step (i) through lithium intercalation/sodium deintercalation by an ion exchange method.

According to a preferred embodiment of the present invention, step (ii) includes the step of chemically deintercalating sodium from the cathode material synthesized from the step (i), and chemically intercalating lithium into the cathode material.

According to a preferred embodiment of the present invention, the cathode material obtained from step (ii) is uniformly mixed with a carbon conductive material at a ratio of about 60:40 to about 90:10, followed by ball milling. It is contemplated within the scope of the invention that the aforementioned range includes all sub-ranges within the specified range. For example, the ratio of cathode material to carbon conductive material may range from about 60:40 to about 61:39, 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, or 90:10. Similarly, the ratio of cathode material to carbon conductive material may range from about 90:10 to about 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34, 65:35, 64:36, 63:37, 62:38, 61:39, or 60:40. It is further contemplated within the scope of the invention that the ratio of cathode material to carbon conductive material may include all intervening ratios, for example, about 60:40, about 61:39, about 62:38, about 63:37, about 64:36, about 65:35, about 66:34, about 67:33, about 68:32, about 69:31, about 70:30, about 71:29, about 72:28, about 73:27, about 74:26, about 75:25, about 76:24, about 77:23, about 78:22, about 79:21, about 80:20, about 81:19, about 82:18, about 83:17, about 84:16, about 85:15, about 86:14, about 87:13, about 88:12, about 89:11, and about 90:10, as well as all intervening decimal values. Then, the carbon conductive material is uniformly coated on a cathode surface to improve the electric conductivity.

The precursor of the sodium oxide may be selected from sodium phosphate, sodium carbonate, sodium hydroxide, sodium acetate, sodium sulfate, sodium sulfite, sodium fluoride, sodium chloride, sodium bromide, and any mixture thereof.

According to the present invention, the precursor of the manganese oxide may be selected from manganese metal, manganese oxide, manganese oxalate, manganese acetate, manganese nitrate, and any mixture thereof. The precursor of phosphate may be selected from ammonium phosphate, sodium phosphate, potassium phosphate, and any mixture thereof.

Furthermore, LiBr or LiI may be used to cause ion exchange between lithium and sodium during the intercalation of lithium by the ion exchange method. The carbon conductive material may be citric acid, sucrose, Super-P, acetylene black, Ketchen Black, carbon or any combination of the foregoing.

Hereinafter, the present invention will be described in more detail with reference to the accompanying drawings.

The present invention provides a cathode material for a secondary battery, which includes a compound represented by the Formula:

$$Li_xNa_{2-x}MnPO_4F, \text{ where } 0<x<2.$$

In an exemplary embodiment, the cathode material includes both lithium and sodium, shows a potential discharge plateau at about 3.7V to about 4.0V, and is coated with carbon for conductivity improvement.

Hereinafter, the method for producing a cathode material for a secondary battery, according to the present invention will be described. The specific production method will be more easily understood through the following Examples.

For example, the cathode material $Na_2MnPO_4F$ for a secondary battery is prepared by uniformly mixing sodium oxide or a precursor thereof, manganese oxide or a precursor thereof, phosphate or a precursor thereof, and fluoride or a precursor thereof through ball milling, carrying out pretreatment on the mixture, and carrying out heat treatment by firing the mixture obtained from the pretreatment. According to the invention, the prepared $Na_2MnPO_4F$ has a particle size of about 1 μm or less, and an average particle size of about 300 nm. $Na_2MnPO_4F$ prepared according to the invention is introduced into an acetonitrile solution including, for example, LiBr dissolved therein. Then, Argon gas is flowed into the solution while the temperature is raised so that ion exchange between lithium and sodium can be carried out. By washing and drying the resultant product of the ion exchange, a cathode material, manganese fluorophosphate $Li_xNa_{2-x}MnPO_4F$, is obtained.

In order to increase electrical conductivity, the obtained cathode material, $Li_xNa_{2-x}MnPO_4F$, was subjected to carbon coating.

The precursor of the sodium oxide may be any suitable sodium containing compound including, but not particularly limited to, sodium carbonate, sodium hydroxide, sodium acetate, sodium sulfate, sodium sulfite, sodium fluoride, sodium chloride, sodium bromide, and any mixture thereof.

The precursor of the manganese oxide may be any suitable manganese containing compound including, but not particularly limited to, manganese metal, manganese oxide, manganese oxalate, manganese acetate, manganese nitrate, and any mixture thereof.

The precursor of phosphate may be any suitable phosphate containing compound including, but not particularly limited to, lithium phosphate, sodium phosphate, potassium phosphate and any mixture thereof.

The precursor of fluorine may be any suitable fluorine containing compound including, but not particularly limited to, metal fluoride, fluoride, and a mixture thereof.

The lithium source used for the ion exchange may be any suitable lithium containing compound including, but not particularly limited to, LiBr, LiI, or any lithium compound mixture suitable for causing ion exchange.

The solvent used for the ion exchange may be any solvent suitable for including, but not limited to, acetonitrile. The carbon conductive material may be, but is not particularly limited to, citric acid, sucrose, super-P, acetylene black, Ketchen Black, or any suitable carbon material.

The cathode material of the exemplary embodiment of the present invention prepared as described above may be used for manufacturing a lithium secondary battery. Herein, the manufacturing method is the same as a conventional lithium secondary battery manufacturing method except for the application of the cathode material. Hereinafter, the configuration and the manufacturing method of the secondary battery will be briefly described.

First, in a manufacturing process for a cathode plate using the inventive cathode material, the cathode material is added with one, two, or more kinds of conventionally used additives, such as, for example, a conductive material, a binding agent, a filler, a dispersing agent, an ion conductive material, and a pressure enhancer, as required, and the mixture is formed into a slurry or paste with an appropriate solvent (such as, e.g., an organic solvent). Then, the obtained slurry or paste is applied to an electrode supporting substrate by an appropriate technique such as, for example, the "doctor blade" method, etc., and then dried. Then, through pressing by rolling a roll, a final cathode plate is manufactured.

According to the invention, examples of the conductive material include graphite, carbon black, acetylene black, Ketchen Black, carbon fiber, metal powder, and the like. The binding agent may include, but is not limited to, PVdF, polyethylene, and the like. The electrode supporting substrate (collector) may include, but is not limited to, a foil or a sheet made of copper, nickel, stainless steel, aluminum, carbon fiber, or the like.

By using the cathode plate prepared as described above, a lithium secondary battery is manufactured. The lithium secondary battery may be manufactured into a variety of different shapes including, but not limited to, a coin shape, a button shape, a sheet shape, a cylindrical shape, or a square shape. Also, an anode, an electrolyte, and a separator for the lithium secondary battery are the same as those used in a conventional lithium secondary battery.

According to the exemplary embodiment of the present invention, the anode material may be a graphite-based material that does not include lithium. Additionally, the anode material may also include one, two, or more kinds of transition metal composite oxides including lithium. The anode material may also include, silicon, tin, etc.

The electrolyte may be, but is not limited to, a non-aqueous electrolyte including lithium salt dissolved in an organic solvent, an inorganic solid electrolyte, or a composite of an inorganic solid electrolyte. The solvent for the non-aqueous electrolyte may be, but is not limited to, one, two, or more solvents selected from the group including esters (such as, e.g., ethylene carbonate, propylene carbonate, dimethyl carbonate, diethyl carbonate, methyl ethyl carbonate), lactones (such as, e.g., butyl lactone), ethers (such as, e.g., 1,2-dimethoxy ethane, ethoxy methoxy ethane), and nitriles (such as, e.g., acetonitrile). Examples of lithium salt of the non-aqueous electrolyte may include, but is not limited to, $LiAsF_6$, $LiBF_4$, $LiPF_6$, or the like.

Also, as the separator, a porous film prepared from a polyolefin such as, for example, PP and/or PE, or a porous material such as non-woven fabric may be used.

EXAMPLES

Hereinafter, the following examples are provided to further illustrate the invention, but they should not be considered as the limit of the invention. The following examples illustrate the invention and are not intended to limit the same.

Example 1

Sodium carbonate ($Na_2CO_3$), manganese oxalate.hydrate ($MnC_2O_4.2H_2O$), sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resulting mixture was subjected to pretreatment at 300° C. for 2 hours under an air atmosphere, and fired at 500° C. for 6 hours under an argon gas atmosphere. Then, the resulting $Na_2MnPO_4F$ was precipitated in acetonitrile including 0.6 M of LiBr dissolved therein, and reacted together with the flow of argon gas at a temperature of 80° C.

The test sample, in which ion exchange was completed, was washed with anhydrous ethanol to remove the remaining NaBr, and subsequently dried. Then, the resulting test sample was uniformly mixed with Super-P in a ratio of 75:25 by ball-milling and then, prepared as a cathode material composite.

Example 2

Sodium carbonate ($Na_2CO_3$), manganese oxalate.hydrate ($MnC_2O_4.2H_2O$), sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resulting mixture was subjected to pretreatment at 300° C. for 2 hours under an air atmosphere, and fired at 500° C. for 6 hours under an argon gas atmosphere. Then, the resultant $Na_2MnPO_4F$ was precipitated in acetonitrile including 1.0 M of LiBr dissolved therein, and reacted together with the flow of argon gas at a of 80° C.

The test sample, in which ion exchange was completed, was washed with anhydrous ethanol to remove the remaining NaBr, and subsequently dried. Then, the resulting test sample was uniformly mixed with Super-P in a ratio of 75:25 by ball-milling, and then prepared as a cathode material composite.

Example 3

Sodium carbonate ($Na_2CO_3$), manganese oxalate.hydrate ($MnC_2O_4.2H_2O$), sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resultant mixture was subjected to pretreatment at 300° C. for 2 hours under an air atmosphere, and fired at 500° C. for 6 hours under an argon gas atmosphere. Then, the resulting $Na_2MnPO_4F$ was precipitated in acetonitrile including 2.5 M of LiBr dissolved therein, and reacted together with the flow of argon gas at a temperature of 80° C.

The test sample, in which ion exchange was completed, was washed with anhydrous ethanol to remove remaining NaBr, and subsequently dried. Then, the resulting test sample was uniformly mixed with Super-P in a ratio of 75:25 by ball-milling, and then prepared as a cathode material composite.

Comparative Example 1

$Na_2MnPO_4F$ obtained under the same condition as described in Example 1, without an ion exchange step, was uniformly mixed with Super-P in a ratio of 75:25 by ball-milling, and then prepared as a cathode material composite.

Comparative Examples 2 to 4

Sodium carbonate ($Na_2CO_3$), manganese oxalate.hydrate ($MnC_2O_4.2H_2$% sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resulting mixture was subjected to pretreatment at 300° C. for 2 hours under an air atmosphere, and fired at 500° C. for 10 hours under an argon gas atmosphere. Then, the resultant $Na_2MnPO_4F$ was precipitated in acetonitrile including 0.6 M (Comparative Example 2), 1.0 M (Comparative Example 3), or 2.5 M (Comparative Example 4) of LiBr dissolved therein, and reacted together with the flow of argon gas at a temperature of 80° C. The test sample, in which ion exchange was completed, was washed with anhydrous ethanol to remove the remaining NaBr, and subsequently dried. Then, the resulting test sample was uniformly mixed with Super-P in a ratio of 75:25 by ball-milling, and then prepared as a cathode material composite.

Comparative Examples 5 to 7

Sodium carbonate ($Na_2CO_3$), manganese oxalate.hydrate ($MnC_2O_4.2H_2O$), sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resulting mixture was subjected to pretreatment at 300° C. for 2 hours under an air atmosphere, and fired at 550° C. for 3 hours under an argon gas atmosphere. Then, the resulting $Na_2MnPO_4F$ was precipitated in acetonitrile including 0.6 M (Comparative Example 5), 1.0 M (Comparative Example 6), 2.5 M (Comparative Example 7) of LiBr dissolved therein, and reacted together with the flow of argon gas at a temperature of 80° C. The test sample, in which ion exchange was completed, was washed with anhydrous ethanol to remove remaining NaBr, and subsequently dried. Then, the resulting test sample was uniformly mixed with Super-P in a ratio of 75:25 by ball-milling, and then prepared as a cathode material composite.

Comparative Examples 8 to 10

Sodium carbonate ($Na_2CO_3$), manganese oxalate.hydrate ($MnC_2O_4.2H_2O$), sodium fluoride (NaF), sodium hydrogen carbonate ($NaHCO_3$), and ammonium phosphate ($NH_4H_2PO_4$) were introduced in predetermined amounts with respect to the total amount of 10 g, and ball milled for 6 hours to uniformly mix the materials.

The resulting mixture was subjected to pretreatment at 300° C. for 2 hours under an air atmosphere, and fired at 550° C. for 6 hours under an argon gas atmosphere. Then, the resultant $Na_2MnPO_4F$ was precipitated in acetonitrile including 0.6 M (Comparative Example 8), 1.0 M (Comparative Example 9), 2.5 M (Comparative Example 10) of LiBr dissolved therein, and reacted together with the flow of argon gas, at a temperature of 80° C. The test sample, in which ion exchange was completed, was washed with anhydrous ethanol to remove remaining NaBr, and subsequently dried. Then, the resultant test sample was uniformly mixed with Super-P in a ratio of 75:25 by ball-milling, and then prepared as a cathode material composite.

Experimental Example 1

Test on Electrode Performance

The primary particle size of cathode materials prepared from Examples 1 to 3, and Comparative Examples 1 to 10 was measured, and metal composition within the cathode materials was analyzed, by ICP emission spectrochemical analysis. The results are noted in Table 1.

TABLE 1

| | LiBr | | Composition analysis result (molar ratio) | | | |
| --- | --- | --- | --- | --- | --- | --- |
| | molarity | Primary particle size | Li | Na | Mn | $PO_4$ |
| Exp. 1 | 0.6M | 300 nm | 0.3 | 1.7 | 1.0 | 1.0 |
| Exp. 2 | 1.0M | 300 nm | 0.6 | 1.4 | 1.0 | 1.0 |
| Exp. 3 | 2.5M | 300 nm | 1.9 | 0.1 | 1.0 | 1.0 |
| Comp. Exp. 1 | — | 300 nm | 0.0 | 2.0 | 1.0 | 1.0 |
| Comp. Exp. 2 | 0.6M | 400 nm | 0.13 | 1.87 | 1.0 | 1.0 |
| Comp. Exp. 3 | 1.0M | 400 nm | 0.3 | 1.70 | 1.0 | 1.0 |
| Comp. Exp. 4 | 2.5M | 400 nm | 0.65 | 1.35 | 1.0 | 1.0 |
| Comp. Exp. 5 | 0.6M | 500 nm | 0.1 | 1.9 | 1.0 | 1.0 |
| Comp. Exp. 6 | 1.0M | 500 nm | 0.2 | 1.8 | 1.0 | 1.0 |
| Comp. Exp. 7 | 2.5M | 500 nm | 0.4 | 1.6 | 1.0 | 1.0 |
| Comp. Exp. 8 | 0.6M | 700 nm | 0.08 | 1.92 | 1.0 | 1.0 |
| Comp. Exp. 9 | 1.0M | 700 nm | 0.17 | 1.83 | 1.0 | 1.0 |
| Comp. Exp. 10 | 2.5M | 700 nm | 0.35 | 1.65 | 1.0 | 1.0 |

It was found that as the primary particle size decreased, the amount of lithium intercalated into $Li_xNa_{2-x}MnPO_4F$ by ion exchange at the same concentration of LiBr increased. In particular, when the primary particle size ranged from 700 nm to 400 nm, the amount of intercalated lithium was slightly increased according to the decrease of the particle size. However, when the particle size was 300 nm, the amount of intercalated lithium was highly increased. This indicates that lithium intercalation through a chemical method highly depends on the primary particle size. Accordingly, it has been found that in order to intercalate lithium into $Na_2MnPO_4F$ through a chemical method such as ion exchange, it is important to control the particle size. Applicants have discovered that the primary particle size required for effective lithium intercalation by a chemical method is about 300 nm or less. Accordingly, the ball milling conditions and the heat treatment conditions of the starting material are important. As described herein, the control of the particle size was carried out by controlling the ball milling conditions and the heat treatment conditions; however, one of ordinary skill in the art will understand that these conditions may vary according to the types of devices and procedures used for the aforementioned methods. The important aspect is that chemical lithium intercalation is efficient only when the primary particle size is controlled to a predetermined size or less. Accordingly, it is contemplated within the scope of the invention that any methods that produce a primary particle size of about 300 nm or less may be used. According to the invention, it is possible to prepare $Li_xNa_{2-x}MnPO_4F$ including both lithium and sodium.

By using powder of the cathode material composites from Examples 1 to 3 and Comparative Examples 1 to 10, 95 wt % of cathode material composite was mixed with 5 wt % of binding agent PVdF, and then a slurry was prepared by using N-methylpyrrolidone (NMP) as a solvent.

The slurry was applied to aluminum (Al) foil with a thickness of 20 μm, and then dried and consolidated by press. The resulting product was dried under a vacuum at 120° C. for 16 hours, to provide a circular electrode with a diameter of 16 mm.

As a counter electrode, a lithium metal foil punched with a diameter of 16 mm was used, and a polypropylene (PP) film was used as a separator. Also, as an electrolyte, a solution containing 1 M $LiPF_6$ in ethylene carbonate (EC) and dimethoxy ethane (DME) mixed in a ratio of 1:1 (v/v) was used. The electrolyte was impregnated in the separator, and the separator was positioned between the operating electrode and the counter electrode. Then, the electrode performance of a battery was tested by using a case (SUS) as an electrode test cell. The measurement results including discharge capacity are noted in Table 2 below.

TABLE 2

| | Discharge capacity at room temperature (mAhg$^{-1}$) | Discharge voltage (V) |
| --- | --- | --- |
| Exp. 1 | 140 | 1.0 |
| Exp. 2 | 178 | 1.0 |
| Exp. 3 | 197 | 1.0 |
| Comp. Exp. 1 | 55 | 1.0 |
| Comp. Exp. 2 | 83 | 1.0 |
| Comp. Exp. 3 | 112 | 1.0 |
| Comp. Exp. 4 | 134 | 1.0 |
| Comp. Exp. 5 | 72 | 1.0 |
| Comp. Exp. 6 | 98 | 1.0 |
| Comp. Exp. 7 | 129 | 1.0 |
| Comp. Exp. 8 | 43 | 1.0 |
| Comp. Exp. 9 | 54 | 1.0 |
| Comp. Exp. 10 | 97 | 1.0 |

Figure 2:
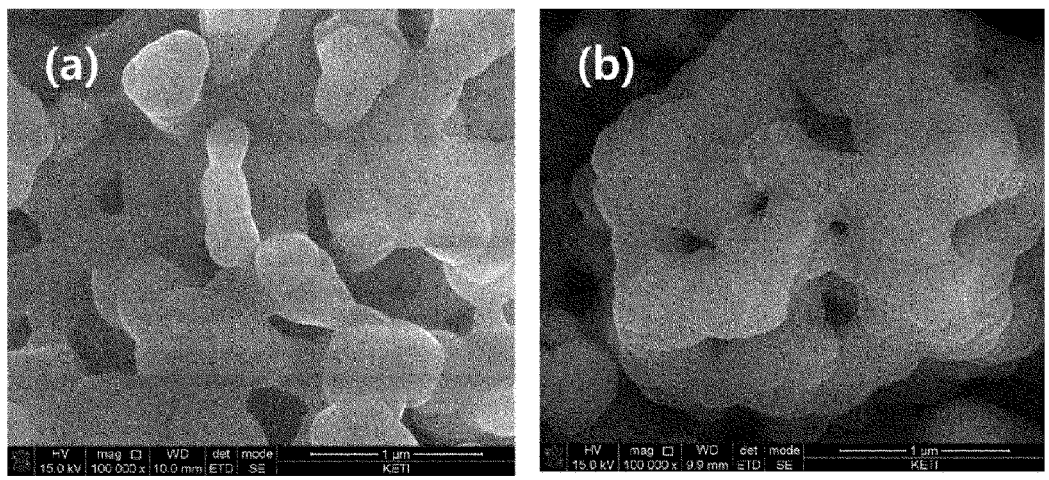

As shown in FIG. 2, when the surface of a test sample from Example 3 was observed by an electron microscope before and after ion exchange treatment, it was observed that the surface of the test sample after ion exchange became rough due to deintercalation of sodium and intercalation of lithium.

Figure 3:
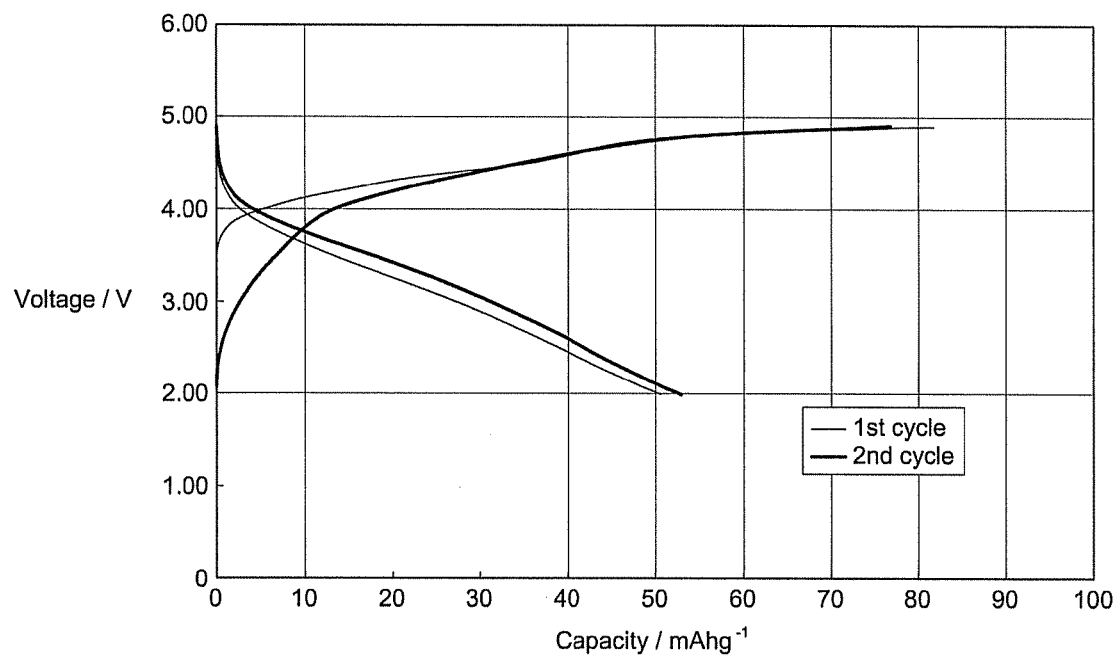
FIG. 3 shows charge/discharge curve graphs of a cathode material prepared according to the methods of Example 1 of the present invention, at room temperature.
Figure 4:
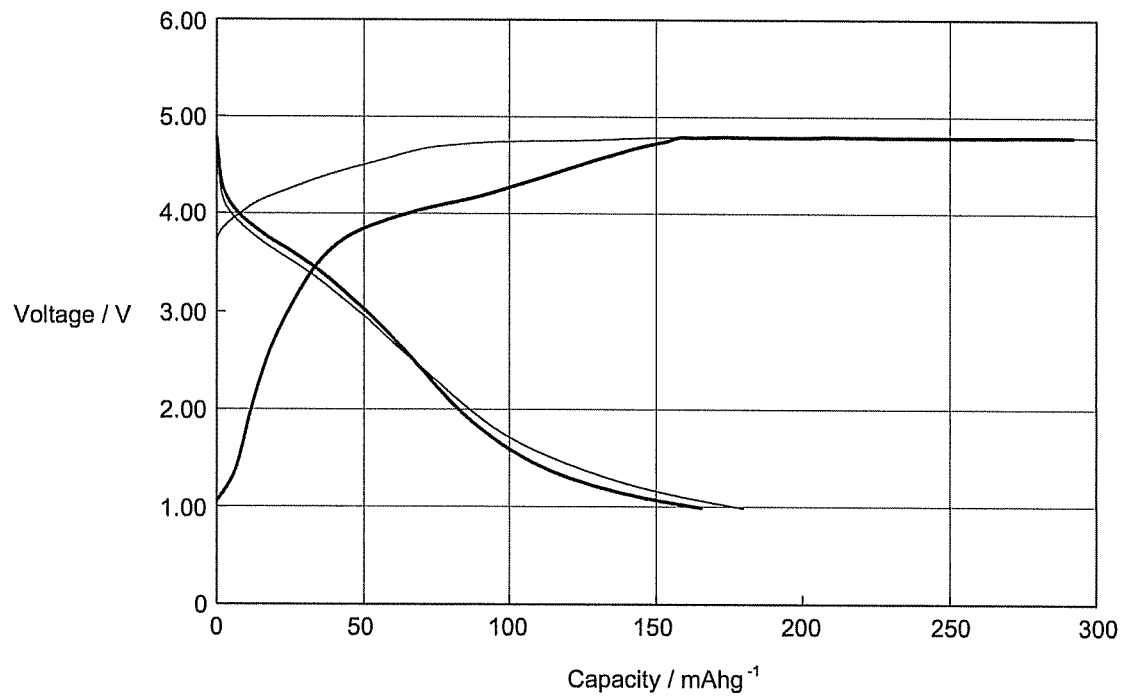
FIG. 4 shows charge/discharge curve graphs of a cathode material prepared according to the methods of Example 1 of the present invention, at room temperature.
Figure 5:
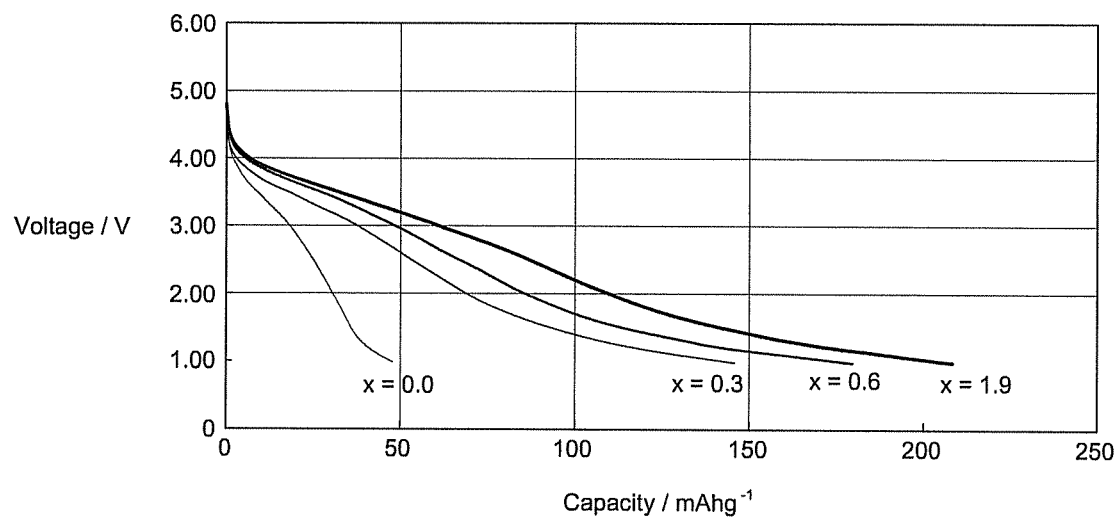
FIG. 5 shows discharge curve graphs of cathode materials prepared according to the methods of Examples 1 to 3, in which a change in a discharge curve according to the amount of intercalated lithium is shown.

The change in the charge/discharge characteristics resulting from ion exchange, was determined by comparing data from Example 1 and Comparative Example 1 (see FIGS. 3 and 4). When ion exchange was not carried out, $Na_2MnPO_4F$ showed a discharge capacity of 55 $mAhg^{-1}$. On the other hand, when 0.3 of lithium was intercalated into $Na_2MnPO_4F$ by ion exchange to produce $Li_{0.3}Na_{1.7}Mn_2PO_4F$, the discharge capacity was 140 $mAhg^{-1}$, which was 2.5 times higher than that of $Na_2MnPO_4F$ alone. Since only 0.3 lithium was intercalated, it was possible to achieve a higher discharge capacity than $Na_2MnPO_4F$ including only sodium. Thus, it has been found that intercalation of lithium has a significant beneficial effect by increasing the electrochemical capacity of manganese-based fluorophosphate. Additionally, as shown in FIG. 5, increasing the amount of intercalated lithium from 0.3 to 1.9 (Examples 1 to 3), further increased the discharge capacity from 140 $mAhg^{-1}$ to 197 $mAhg^{-1}$. From these results, it has been determined that intercalation of lithium into manganese-based fluorophosphate has a significant beneficial effect by increasing electrochemical capacity. Without being bound by theory, it is believed that this is because the intercalated lithium establishes a pathway for lithium diffusion, which has a positive effect on lithium intercalation/deintercalation or sodium intercalation/deintercalation during charging/discharging.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A cathode composition for a lithium secondary battery, comprising: a compound of formula $Li_xNa_{2-x}MnPO_4F$,
    wherein the compound of formula $Li_xNa_{2-x}MnPO_4F$ consists of Li and Na, and $0<x<2$; and
    wherein the compound of formula $Li_xNa_{2-x}MnPO_4F$ has a primary particle size of about 300 nm or less so as to increase lithium intercalating efficiency.

2. The cathode composition of claim 1, wherein the compound of formula $Li_xNa_{2-x}MnPO_4F$ is coated with carbon.

3. The cathode composition of claim 2, wherein the coated compound of formula $Li_xNa_{2-x}MnPO_4F$ has a potential plateau discharge of about 3.7 V to about 4.0V.

4. A method of producing a cathode composition for a lithium secondary battery, comprising:
   (i) mixing sodium (Na) oxide, or a precursor thereof, manganese (Mn) oxide, or a precursor thereof, phosphate (P), or a precursor thereof, and fluoride (F), or a precursor thereof by ball milling to produce a mixture;
   (ii) pretreating the mixture of step (i) under an air atmosphere at about 300° C. for about 2 hours;
   (iii) firing the pretreated mixture at about 500° C. to about 550° C. to synthesize a compound of structure $Na_2MnPO_4F$; and
   (iv) intercalating a source of lithium into the compound of structure $Na_2MnPO_4F$ produced from step (iii) by ion exchange to produce the cathode composition for the lithium secondary battery of structure $Li_xNa_{2-x}MnPO_4F$,
   wherein the cathode composition consists essentially of Li and Na, and $0<x<2$; and
   wherein the cathode composition for the lithium secondary battery of structure $Li_xNa_{2-x}MnPO_4F$ has a primary particle size of about 300 nm or less so as to increase lithium intercalating efficiency.

5. The method of claim 4, wherein the mixture of step (i) is mixed for about 6 hours by ball milling.

6. The method of claim 4, wherein step (iv) further comprises intercalating lithium ions into the compound of structure $Na_2MnPO_4F$ produced from step (iii) by lithium intercalation/sodium deintercalation.

7. The method of claim 4, wherein step (iv) further comprises the step of chemically deintercalating sodium from the compound of structure $Na_2MnPO_4F$ produced from step (iii), and chemically intercalating lithium into the compound of structure $Na_2MnPO_4F$.

8. The method of claim 4, further comprising:
   (v) mixing the cathode composition of structure $Li_xNa_{2-x}MnPO_4F$ produced by step (iv) with a carbon conductive material at a ratio of about 60:40 to about 90:10 by ball milling to produce a coating mixture; and
   (vi) coating a cathode surface with the coating mixture to improve electric conductivity.

9. The method of claim 8, wherein the carbon conductive material is selected from the group consisting of citric acid, sucrose, super-P, acetylene black, Ketchen Black, and carbon.

10. The method of claim 4, wherein the precursor of the sodium oxide is selected from the group consisting of sodium phosphate, sodium carbonate, sodium hydroxide, sodium acetate, sodium sulfate, sodium sulfite, sodium fluoride, sodium chloride, sodium bromide, and any mixture thereof.

11. The method of claim 4, wherein the precursor of the manganese oxide is selected from the group consisting of manganese metal, manganese oxide, manganese oxalate, manganese acetate, manganese nitrate, and any mixture thereof.

12. The method of claim 4, wherein the precursor of the phosphate is selected from the group consisting of ammonium phosphate, sodium phosphate, potassium phosphate, and a mixture thereof.

13. The method of claim 4, wherein the source of lithium is LiBr or LiI.

14. The method of claim 11, wherein the ion exchange is carried out with at least 0.5 M LiBr or at least 0.5 M LiI.

15. A method of producing a cathode surface with electrical conductivity, comprising:
   (i) mixing sodium (Na) oxide, or a precursor thereof, manganese (Mn) oxide, or a precursor thereof, phosphate (P), or a precursor thereof, and fluoride (F), or a precursor thereof by ball milling to produce a mixture;
   (ii) pretreating the mixture of step (i) under an air atmosphere at about 300° C. for about 2 hours;
   (iii) firing the pretreated mixture at about 500° C. to about 550° C. to synthesize a compound of structure $Na_2MnPO_4F$;
   (iv) intercalating a source of lithium into the compound of structure $Na_2MnPO_4F$ produced from step (iii) by ion exchange to produce the cathode composition for a lithium secondary battery of structure $Li_xNa_{2-x}MnPO_4F$;
   (v) mixing the cathode composition of structure $Li_xNa_{2-x}MnPO_4F$ produced by step (iv) with a carbon conductive material at a ratio of about 60:40 to about 90:10 by ball milling to produce a coating mixture; and
   (vi) coating a cathode surface with the coating mixture, thereby producing a cathode surface with electrical conductivity,
   wherein the cathode composition of structure $Li_xNa_{2-x}MnPO_4F$ consists essentially of Li and Na, and $0<x<2$; and
   wherein the cathode composition of structure $Li_xNa_{2-x}MnPO_4F$ has a primary particle size of about 300 nm or less so as to increase lithium intercalating efficiency.

* * * * *